(12) United States Patent
Harrington et al.

(10) Patent No.: US 7,330,978 B1
(45) Date of Patent: Feb. 12, 2008

(54) ENCRYPTED SOFTWARE INSTALLER

(75) Inventors: Richard Alexander Harrington, Seattle, WA (US); Rama I. Srinivasan, Redmond, WA (US); Terence R. Spies, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 09/288,462

(22) Filed: Apr. 8, 1999

(51) Int. Cl.
 *G06F 11/30* (2006.01)
 *G06F 12/14* (2006.01)
 *G06F 7/04* (2006.01)
 *G06F 17/30* (2006.01)
 *H04L 9/32* (2006.01)
 *G06K 9/00* (2006.01)
 *H03M 1/68* (2006.01)

(52) U.S. Cl. .......................... 713/191; 726/26; 726/27; 705/55; 705/57; 705/59

(58) Field of Classification Search ................ 713/191, 713/190, 184; 705/55, 57, 59
See application file for complete search history.

(56) References Cited

U.S. PATENT DOCUMENTS

| | | | | |
|---|---|---|---|---|
| 4,644,493 A * | 2/1987 | Chandra et al. | ............... | 705/56 |
| 5,199,073 A * | 3/1993 | Scott | ........................... | 711/216 |
| 5,530,752 A * | 6/1996 | Rubin | .......................... | 705/59 |
| 5,563,950 A * | 10/1996 | Easter et al. | ................. | 713/172 |
| 5,825,890 A * | 10/1998 | Elgamal et al. | ............. | 380/282 |
| 6,058,478 A * | 5/2000 | Davis | ........................... | 713/170 |
| 6,075,862 A * | 6/2000 | Yoshida et al. | ............. | 380/277 |
| 6,192,474 B1 * | 2/2001 | Patel et al. | .................. | 713/171 |
| 6,327,660 B1 * | 12/2001 | Patel | ........................... | 713/193 |
| 6,473,860 B1 * | 10/2002 | Chan | ........................... | 713/193 |

* cited by examiner

*Primary Examiner*—Benjamin E. Lanier
(74) *Attorney, Agent, or Firm*—Lee & Hayes, PLLC

(57) ABSTRACT

An installation mechanism that securely installs encrypted software modules on a computer is described. The mechanism allows restricted software, such as domestic strength cryptography software, to be shipped directly to a user. The mechanism decrypts the software modules and installs the software modules on the computer only when at least one of a set of trigger files is present on the computer, thereby requiring that the computer be authorized for the restricted software. A setup program invokes each of a plurality of installation modules in order to install the software modules. Each installation module securely encapsulates an encrypted version of the software module and is programmed to decrypt the corresponding software module only when a genuine trigger file is detected.

7 Claims, 5 Drawing Sheets

ENCRYPTED SOFTWARE INSTALLER

FIELD OF THE INVENTION

This invention relates generally to the field of data processing and more particularly to a secure mechanism for installing and upgrading software on a computing system.

BACKGROUND

Current regulations prohibit exporting "strong" cryptographic software outside the United States without a specific export license. For example, these regulations currently prohibit exporting software having more than 56-bit encryption. This prohibition creates problems for releasing, distributing and upgrading cryptographic software because the manufacturer is often forced to produce and distribute two different software versions, a domestic version and an international version.

One known solution for upgrading software has been to ship an installation module that includes an upgrade for a non-restricted software module and an encrypted upgrade for the restricted version of the software module. During the upgrade process the installation module determines what versions of the software module already exist on the computing system. The installation module decrypts and upgrades the restricted version only if a previous version of the restricted software is already present. Otherwise, the installation module upgrades the non-restricted version of the software module.

This approach alleviates some of the problems of upgrading individual software modules but has a number of deficiencies. First, because this approach is based on a one-to-one mapping between the version of the upgrade module and the version of the module already present on the computing system, it is unworkable in the situation where a complete set of software modules must be upgraded. For example, this approach often results in only a subset of the desired software modules being upgraded because the computer may not have previous versions for all of the software modules. Second, this approach only addresses upgrading software modules and does not address the initial installation of restricted software on a computing system.

For these reasons, and for other reasons stated below which will become apparent to those skilled in the art upon reading and understanding the present specification, there is a need in the art for a generalized installation mechanism that is capable of securely installing and upgrading one or more restricted software modules, either individually or as a complete set of software modules.

SUMMARY

The invention is directed toward an improved method and apparatus for securely upgrading and installing restricted software such as domestic strength cryptographic software. In one aspect, the invention is an improved setup program that upgrades one or more software modules when at least one of a set of trigger files are present on a computer. Each software module to be installed is encrypted and encapsulated in a corresponding installation module. Each installation module is invoked by the setup program and is programmed to upgrade the software module when the presence of a corresponding trigger file is detected. In this manner the invention installs the restricted software modules on the computer only when the computer has been previously authorized to use the software modules.

In another aspect, the invention is a set of software modules, referred to as an encryption pack, that is shipped for installation on a computer. The encryption pack includes one or more installation modules and a setup program. The setup program of the encryption pack invokes each installation module, which in turn installs the encapsulated software module if a trigger file is present on the computer. The trigger file can be located on the shipped storage medium, such as a CD, in order to facilitate initial installation. Alternatively, the setup program can direct a user to log onto an authorized website for verification and to download the trigger file. This technique allows restricted software modules, that often are large in size, to be securely shipped to the user on a storage medium while only requiring the user to download a small trigger file. Once the small trigger file is downloaded the user can then access the software modules on the storage medium and install them on the computer.

DETAILED DESCRIPTION

In the following detailed description of exemplary embodiments of the invention, reference is made to the accompanying drawings that form a part hereof and which show specific exemplary embodiments in which the invention may be practiced. It is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. The first section describes the hardware and the operating environment that is suitable for use as a computer for use with the inventive installation mechanism described below. The second section provides a detailed description of the inventive system. The third section provides methods for operating an exemplary embodiment of the invention. Finally, the fourth section provides a conclusion of the detailed description.

Hardware and Operating Environment

Figure 1:
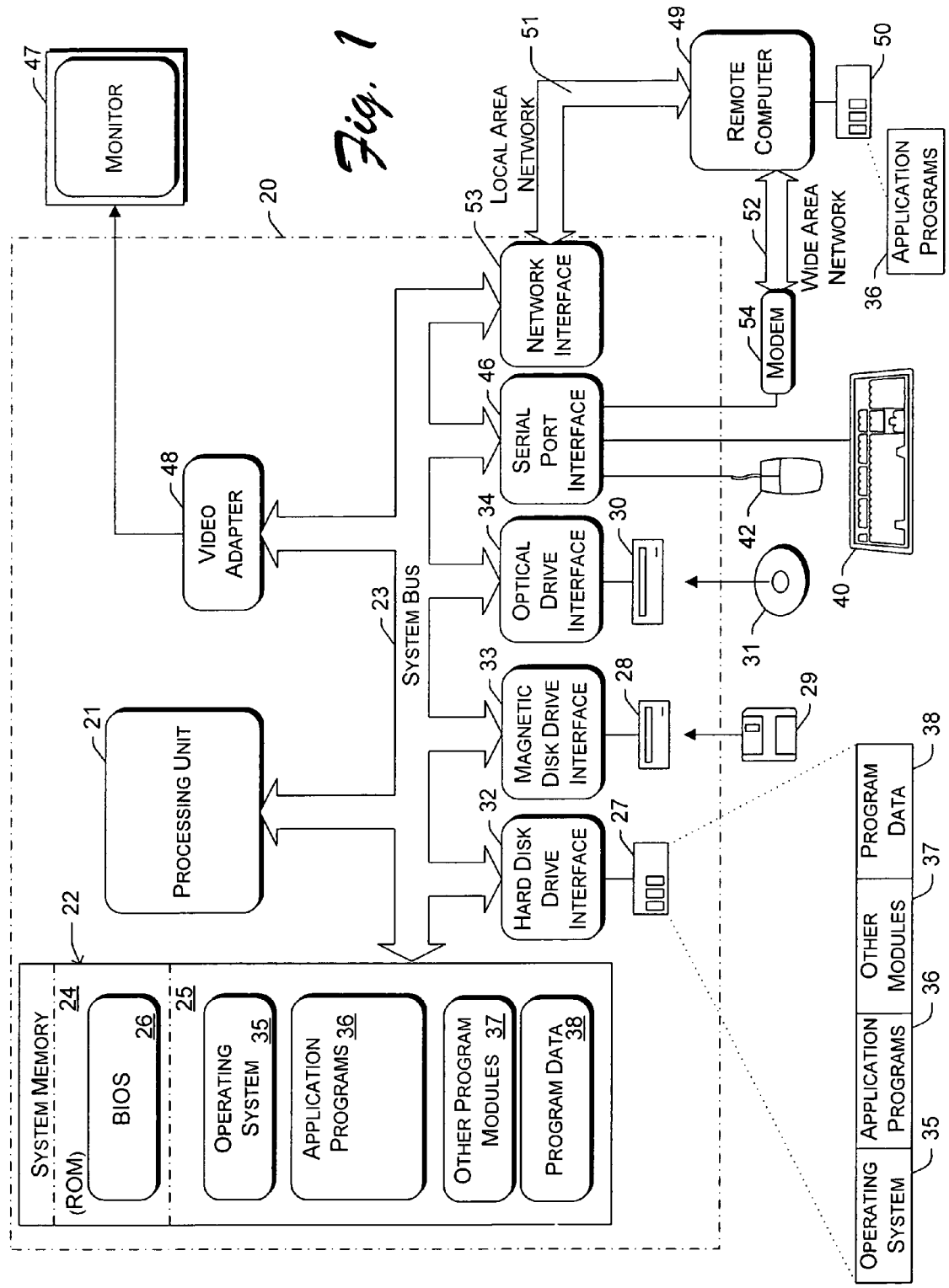
FIG. 1 is a diagram of a suitable computer in conjunction with which embodiments of the invention may be practiced.

FIG. 1 is a diagram of computer suitable for securely installing restricted software modules according to the various embodiments of the invention. For example, in one embodiment the restricted software modules are domestic versions of cryptographic software. The invention is described in the general context of computer-executable instructions, such as program modules, being executed by a computer, such as a personal computer. Generally, program modules include routines, programs, objects, components, data structures, etc., that perform particular tasks or implement particular abstract data types.

The exemplary hardware and operating environment of FIG. 1 includes a general purpose computing device in the form of a computer 20 having processing unit 21, system memory 22, and system bus 23 that operatively couples various system components including system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. Basic input/output system (BIOS) 26 contains routines that help to transfer information between elements within computer 20, such as during start-up, and is stored in ROM 24. Computer 20 further includes hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored by hard disk 27, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to processing unit 21 through serial port interface 46 that is coupled to the system bus, but may be connected by other interfaces, such as a parallel port, game port, or a universal serial bus (USB). Monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

According to the invention, computer 20 executes a setup program in order to securely install one or more restricted software modules. As explained in detail below, each restricted software module is encrypted and encapsulated in a corresponding installation module. The setup program invokes the installation module, which in turn decrypts and installs the restricted software modules only when one or more trigger files are present on computer 20. If none of the trigger files are present on computer 20 then, in one embodiment, the setup program installs a non-restricted version of the software module. In this manner, the installation modules securely install the restricted software modules only when computer 20 is authorized. For example, in one embodiment the restricted software modules are domestic strength cryptographic software modules. In this embodiment the installation modules securely install domestic strength cryptographic software only when computer 20 is authorized to use such software. The international version is installed in the event that suitable trigger files are not found on computer 20.

In one embodiment a manufacturer ships a storage device, such as a CD-ROM, that contains a setup program and a set of software modules, referred to as an encryption pack, for installation on computer 20. Each software module of the encryption pack is encrypted and encapsulated in a corresponding installation module. In one embodiment the setup program of the encryption pack directs a user to log into an authorized website for verification and to download a trigger file for the encryption pack. This technique allows several restricted software modules to be securely shipped to the user while only requiring the user to download a small trigger file in order to install the software modules on computer 20. Alternatively a trigger file may be shipped on the CD-ROM for immediate installation.

Figure 2:
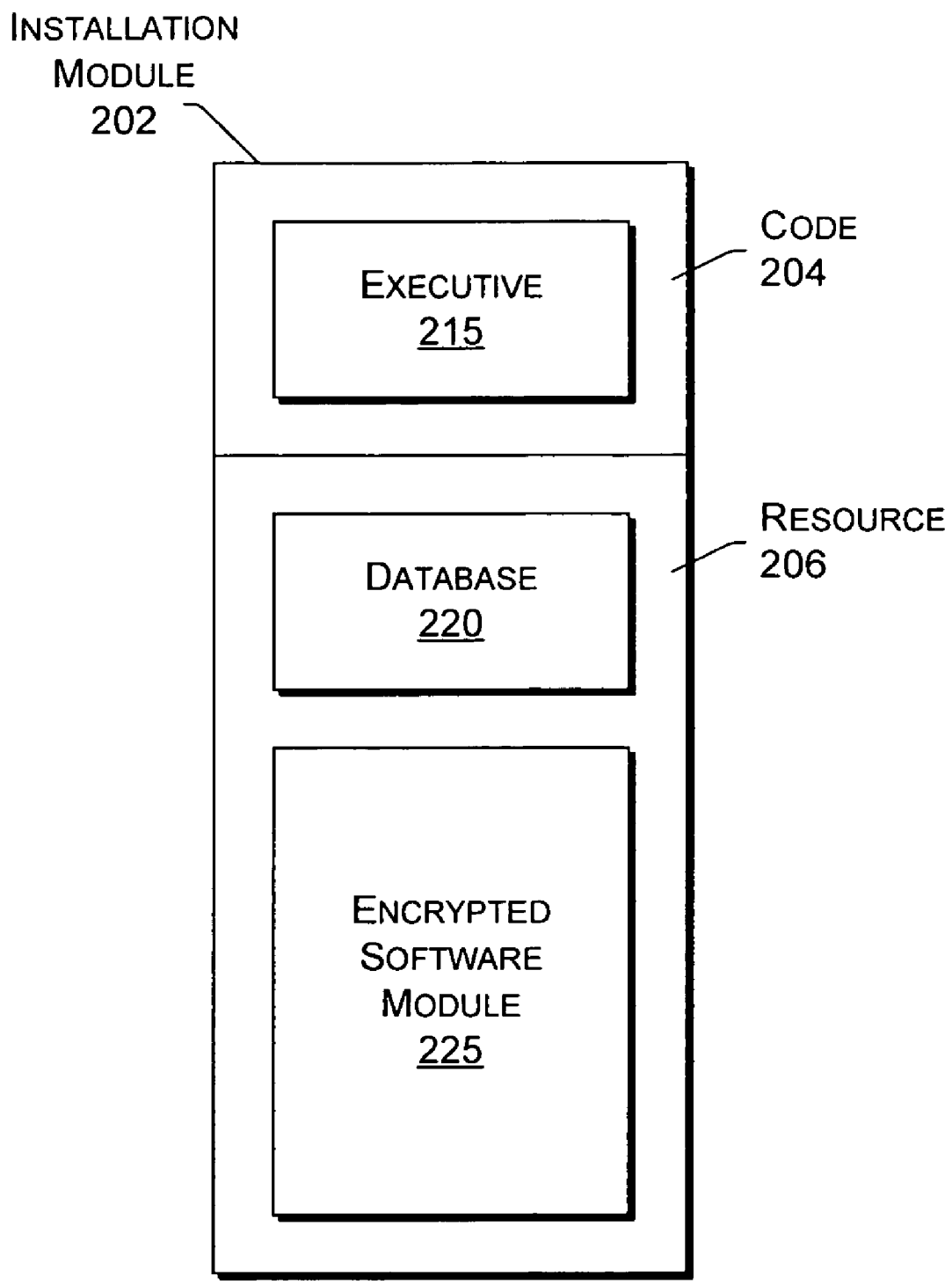
FIG. 2 is a block diagram illustrating one embodiment of an installation module that is invoked by a setup program for securely installing software onto the computer of FIG. 1 according to the invention.

FIG. 2 is a block diagram illustrating one embodiment of an installation module 202 that is invoked by the setup program. Installation module 202 comprises code portion 204 and resource portion 206. Resource portion 206 contains database 220 and the encrypted software module 225 that is to be installed on computer 20. Code portion 204 includes executive 215 that, as discussed in detail below, is executable software that decrypts software module 225 when one or more trigger files of a set of trigger files are present on computer 20. Database 220 maintains information for identifying the trigger files. A trigger file may be a previous version of software module 225 or may be any file suitable for indicating that computer 20 is authorized for having software module 225 installed. As described above, for initial installation the user may download a trigger file from an authorized Internet website or a trigger file may be included on the CD.

Figure 3:
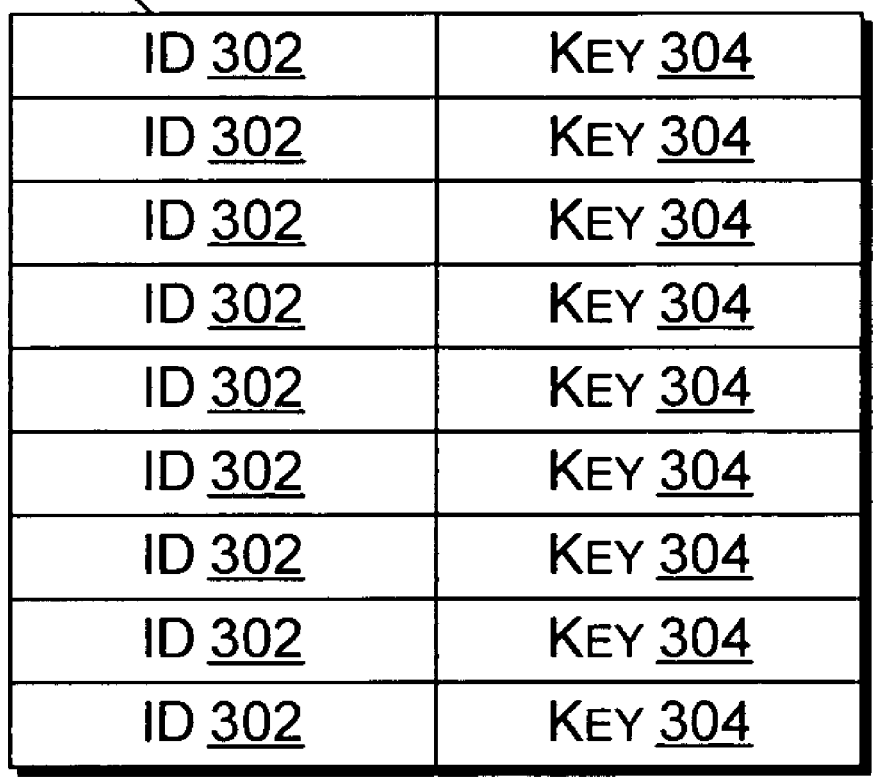
FIG. 3 is a block diagram illustrating one embodiment of a database that is encapsulated within the installation module of FIG. 2.

FIG. 3 is a block diagram illustrating one embodiment of database 220 of installation module 202. In this embodiment database 220 is a table having two columns and a plurality of rows. Each row corresponds to a trigger file that, when present, triggers the installation of encrypted software module 225. For example, there will be a row within the table for each previous version of software module 225. Other trigger files can be added to the table by adding rows.

Each row of database 220 includes an identifier 302 that is used to determine whether the corresponding trigger file is present on computer 20. In one embodiment, identifier 302 is a first cryptographic hash value generated by hashing the trigger file with a first hash algorithm. Each row further includes a key 304 that is used to decrypt software module 225 when the trigger file is present. Key 304 is encrypted to prevent unauthorized users from manually decrypting and installing software module 225. In one embodiment, key 304 is encrypted as a function of a second cryptographic hash value produced by hashing the corresponding trigger file with a second hash algorithm. Thus, in the event that the trigger file is present on computer 20, the first hash value of the trigger file matches ID 303 and the second hash value can be used to decrypt key 304 such that software module 225 can then in turn be decrypted and installed.

Methods of an Exemplary Embodiment of the Invention

In the previous section, a system level overview of the operation of exemplary embodiments of the invention was described. In this section, the particular methods performed by the exemplary embodiments are described by reference to a flowchart. The methods to be performed by the embodiments constitute computer programs made up of computer-executable instructions. Describing the methods by reference to a flowchart enables one skilled in the art to develop such programs including such instructions to carry out the methods on suitable computing systems from computer-readable media.

Figure 4:
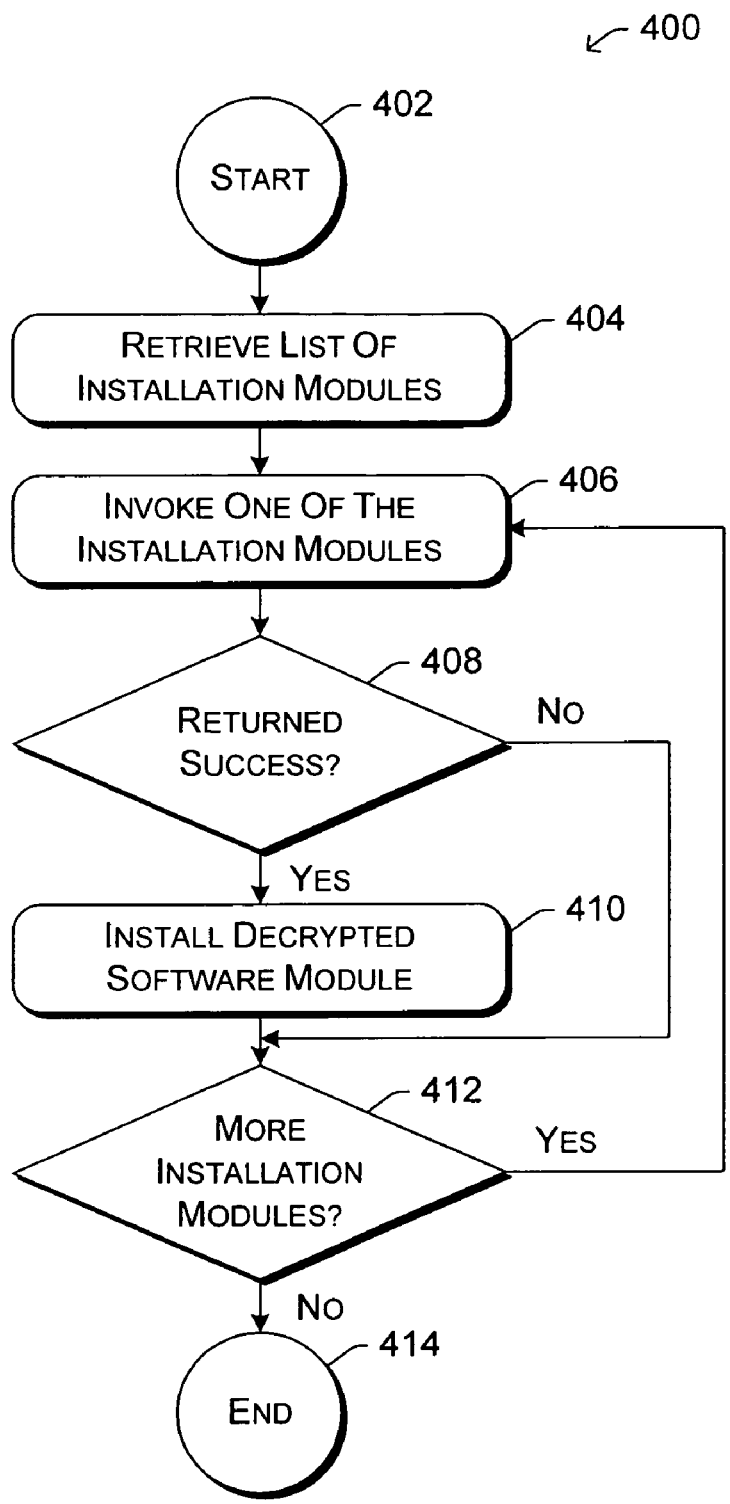
FIG. 4 is a flowchart illustrating one exemplary method of operation of the setup program that securely installs and upgrades software modules.

FIG. 4 is a flowchart 400 that illustrates one exemplary method of operation of the above-described systems. In order to securely install restricted software on computer 20 the setup program begins with block 402, proceeds to block 404 and retrieves a list of all of the installation modules 202. For example, in the encryption pack embodiment a manufacturer of software may ship a CD-ROM that contains a plurality of installation modules 202. In one embodiment the setup program retrieves the list from a registry within computer 20.

When the list is received, the setup program proceeds to block 406 and invokes each installation module 202 by executing the corresponding executive 215 contained therein. As explained below, executive 215 returns failure when no trigger file is present on computer 20. When at least one trigger file is present executive 215 decrypts software module 225 and returns a pointer to the decrypted software module 225.

In block 408 the setup program determines whether the invoked executive 215 succeeded or failed. If executive 215 failed then the setup program jumps to block 412. If executive 215 succeeded then the setup program proceeds to 410 and installs the decrypted software module 225 that was returned by executive 215.

In block 412 the setup program loops back to block 406 in the event that there are more installation modules 202 to invoke. Once all of the installation modules 202 have been invoked the setup program proceeds to block 414 and terminates.

Figure 5:
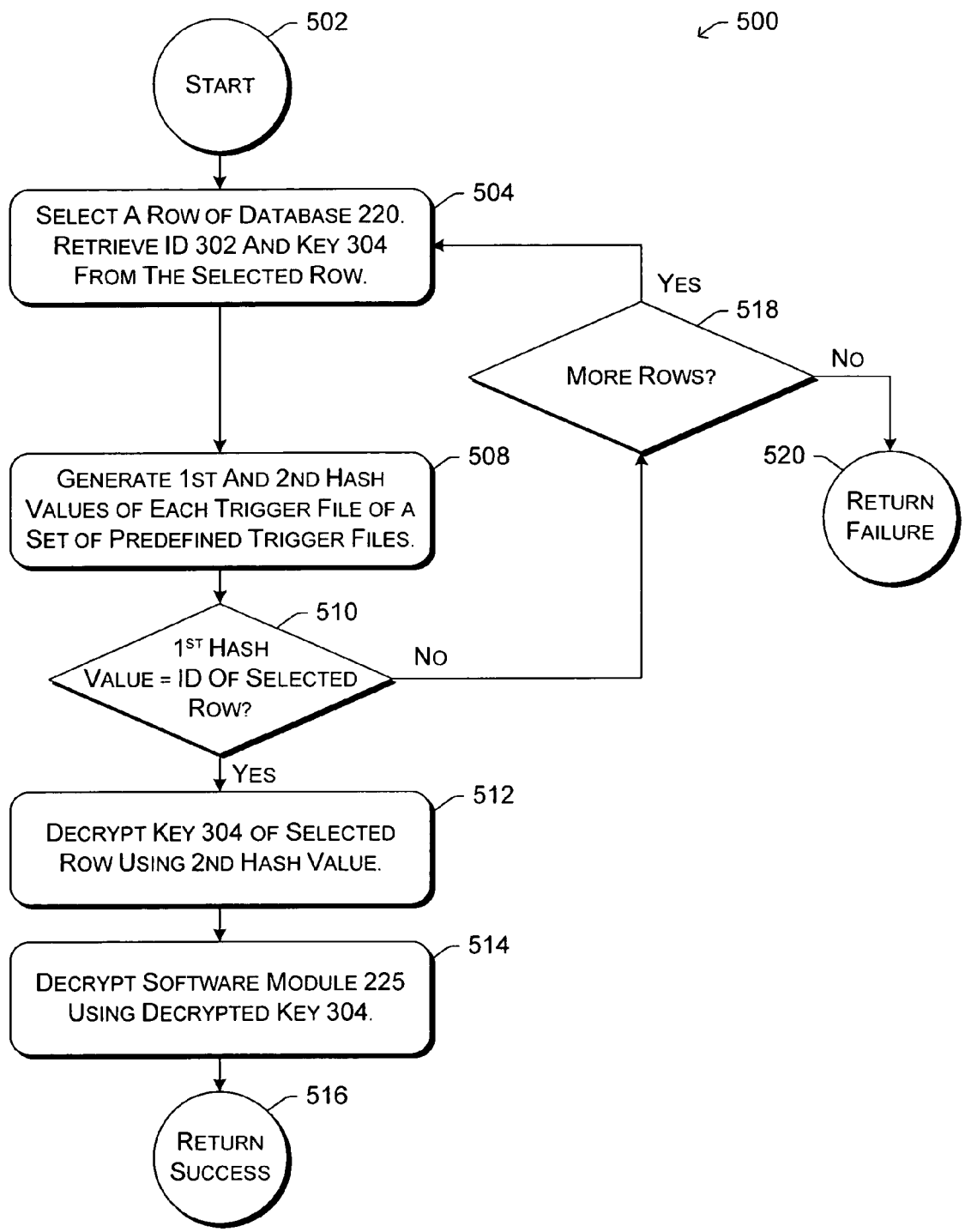
FIG. 5 is a flowchart illustrating one exemplary method of operation of the installation module of FIG. 2 when invoked by the setup program.

FIG. 5 is a flowchart 500 that illustrates one exemplary method of operation of executive 215 when invoked by the setup program in block 406 of flowchart 400. Executive 215 begins with block 502, proceeds to block 504 and accesses database 220. More specifically, executive 215 selects one of the rows of database 220 and retrieves ID 302 and key 304.

In block 508, executive 215 determines whether the trigger file that corresponds to the selected row exists within computer 20. For new installations the trigger file may be shipped with the encryption pack or the setup program may direct the user to download the trigger file from an Internet website. In order to determine whether the trigger file is present executive 215 examines computer 20 and generates a first hash value and a second hash value for each trigger file of a set of predefined trigger files that is present on computer 20.

In block 510 installation module 202 verifies that the identified trigger file is indeed a genuine trigger file by comparing the generated first hash values to ID 302 of the selected row. If none of the generated first hash values match ID 302 then installation module 202 jumps back to block 518. If any of the generated hash values match ID 302 of the selected row then a genuine trigger file is present.

When a match is found, installation module 202 proceeds to block 512 and uses the second hash value to decrypt key 304. In block 514 installation module 202 uses key 304 to decrypt software module 225. In block 516 installation module 202 successfully terminates and returns a pointer to the decrypted software module 225 for use by the calling setup program.

The particular methods for installing encrypted software according to the invention have been described. The methods have been shown by reference to flowcharts that describe various embodiments of the setup program and the installation modules.

Conclusion

An installation process has been described that securely installs restricted software modules on a computer. Although specific embodiments have been illustrated and described herein, it will be appreciated by those of ordinary skill in the art that any arrangement which is calculated to achieve the same purpose may be substituted for the specific embodiments shown. Therefore, this application is intended to cover any adaptations or variations of the present invention.

For example, those of ordinary skill within the art will appreciate that in one embodiment the inventive setup program and installation module upgrade a corresponding software module when at least one of a set of trigger files is installed on the computer. Each installation module securely encapsulates an encrypted version of a corresponding software module and is programmed to determine whether a genuine trigger file exists. In another embodiment, the invention is a set of software modules, referred to as an encryption pack, that is shipped for new installation on a computer.

We claim:

1. A computer-readable medium storing an installation module, said installation module comprising:
    an encrypted software module that is a first version of the software module;
    a decryption key to decrypt the encrypted software module, wherein the decryption key is encrypted as a function of a cryptographic hash value produced by hashing a corresponding trigger file with a hash algorithm; and
    an executive for using the decryption key to decrypt the encrypted software module when at least one of a set of trigger files is stored on a computing system and to install the first version of the software module on the computing system when at least one of the set of trigger files is stored on the computing system, wherein each of the trigger files indicates authorization to install the encrypted software module, and wherein the first version of the software module uses greater than a threshold strength encryption; wherein a second version of the software module is installed if at least one of the set of trigger files is not stored on the computing system, and wherein the second version of the software module uses a strength encryption that is not greater than the threshold strength encryption.

2. A computer-readable medium storing an installation module, said installation module comprising:
    an encrypted software module;
    a key, wherein the key is encrypted as a function of a cryptographic hash value produced by hashing a corresponding trigger file with a hash algorithm;
    an executive for decrypting and installing the encrypted software module with the key when at least one of a set of trigger files is stored on a computing system, wherein the encrypted software module uses greater than a threshold strength encryption, wherein a different version of the software module is installed when at least one of the set of trigger files is not stored on the computing system, and wherein the different version of the software module uses a strength encryption that is not greater than the threshold strength encryption; and
    a database for identifying the trigger files.

3. The computer-readable medium of claim 2, wherein the database includes the key.

4. The computer-readable medium of claim 3, wherein the key is encrypted.

5. The computer-readable medium of claim 2, wherein the database includes a hash value for each of the trigger files.

6. The computer-readable medium of claim 1, wherein the encrypted software module is a cryptographic software module.

7. The computer-readable medium of claim 6, wherein the encrypted software module is a dynamic-link library (DLL) for providing a secure socket layer (SSL).

* * * * *